(12) United States Patent
Mes et al.

(10) Patent No.: US 7,797,464 B2
(45) Date of Patent: Sep. 14, 2010

(54) CONFIGURING DATA TRANSMISSION OVER ONE OR MORE LINE CARDS GLOBALLY OR INDIVIDUALLY

(75) Inventors: Ian Mes, Nepean (CA); Ian Dublin, Nepean (CA); Christian Bourget, Gatineau (CA)

(73) Assignee: Ciena Corporation, Linthicum, MD (US)

( * ) Notice: Subject to any disclaimer, the term of this patent is extended or adjusted under 35 U.S.C. 154(b) by 940 days.

(21) Appl. No.: 11/517,465

(22) Filed: Sep. 8, 2006

(65) Prior Publication Data

US 2008/0062975 A1 Mar. 13, 2008

(51) Int. Cl.
G06F 3/00 (2006.01)
H04L 12/56 (2006.01)

(52) U.S. Cl. .................. 710/30; 370/389; 370/439; 370/465

(58) Field of Classification Search .............. 710/30
See application file for complete search history.

(56) References Cited

U.S. PATENT DOCUMENTS

2002/0136170 A1* 9/2002 Struhsaker ............ 370/280
2003/0137975 A1* 7/2003 Song et al. ............ 370/353
2003/0189917 A1* 10/2003 Sudo .................... 370/347
2006/0013325 A1* 1/2006 Agrawal et al. .......... 375/260

* cited by examiner

Primary Examiner—Christopher B. Shin
Assistant Examiner—Brooke J Dews
(74) Attorney, Agent, or Firm—Clements Bernard PLLC; Christopher L. Bernard; Lawrence A. Baratta, Jr.

(57) ABSTRACT

A system and method for optimizing the transmission of signals over a group of wires. In a preferred form of the present invention, a multi-wire bus connects a common card to a plurality of line cards. A framing protocol controls transmissions between the common card and the plurality of line cards. The framing protocol includes a frame having a prefix that identifies in which direction a given transmission will occur. The prefix also identifies over which wire or wires a given line card will receive data. Each of the line cards are configured to interpret the prefix so that at any given time data can be transmitted from the common card to one or more of the line cards by either transmission over a single wire or a plurality of wires.

12 Claims, 5 Drawing Sheets

| Nibble | Parameter | Description |
| --- | --- | --- |
| 0-1 | Block_Byte_Num | Number of bytes in all blocks except the last block in a frame |
| 2 | Last_Block_Byte_Delta | Number of bytes to add to Block_Byte_Num to get the number of bytes in the last block of a frame (range=-8 to 7,; MSB is a sign bit) |
| 3 | FEC_T | T parameter for Reed-Soloman Encoder (number of correctable errors) |
| 4 | PAM | Number of bits per symbol during payload transmission |
| 5 | Max_Block_Num | Maximum Block Number per frame (i.e., number of blocks --1) |

Fig. 9

CONFIGURING DATA TRANSMISSION OVER ONE OR MORE LINE CARDS GLOBALLY OR INDIVIDUALLY

FIELD OF THE INVENTION

The present invention relates generally to a method and apparatus for optimizing the transmission of signals over a group of wires. More particularly, preferred forms of the present invention are directed to a method and apparatus that use a framing protocol to optimize transmission of signals over a group of wires while minimizing system resources.

BACKGROUND OF THE INVENTION

In various forms of electronic equipment, e.g. a legacy shelf, signals are communicated between a common card and a plurality of line cards over a bus. The legacy shelf can be found in communication systems providing both POTS and DSL services. One such system is the CNX-5 Broadband DSL system. This system DSL enables Lucent SLC® Series 5 (SLC-5) Digital Loop Carriers. This system allows a service provider to deliver both POTS and DSL services on any copper pair without compromising POTS density.

In the SLC-5, the legacy shelf utilizes six (6) copper single ended wires of the existing ten (10) wire metallic test bus to create a 66 MPS capacity bus by dedicating four (4) of the six (6) wires to downstream traffic from a common card to a plurality of line cards and two (2) of the six (6) wires to upstream traffic from the line cards to the common card. A schematic of a legacy shelf is depicted in FIG. 1. The legacy shelf or dual channel bank includes bank A having forty-eight (48) line cards and bank B having forty-eight (48) line cards. Wires A1 through A6 connect the line cards in bank A to a common card C. Similarly, Wires B1 through B6 connect the line cards in bank B to the common card C. The line cards in each bank receive the signals with respect to ground.

With a legacy shelf having wires dedicated to traffic in only one direction, it is not possible to readily deploy advanced new communications products to deliver data transmissions at higher speeds than the system was originally designed to accommodate. For example, dedicating certain wires of the bus to either downstream traffic or upstream traffic limits the efficiency of the system when there is either no current downstream or upstream traffic. Another example of the limitations of previously configured legacy shelves is the cross talk that must be treated as high level noise stemming from the simultaneous transmission of downstream and upstream traffic over two or more of the group of wires. Crosstalk increases with the signal frequency, so the data baud rate is limited due to degradation of signal to noise.

Accordingly, there is a need for an apparatus and method to overcome these and other disadvantages of exiting systems.

OBJECTS AND SUMMARY OF THE INVENTION

It is an object of a preferred embodiment of the present invention to obviate or mitigate at least some of the above-mentioned disadvantages of previously developed systems.

It is another object of a preferred embodiment of the present invention to provide a method and system that ensures that all theoretical backplane bandwidth is available (i.e., no trapped bandwidth).

It is a further object a preferred embodiment of the present invention to provide a method and apparatus that minimizes the DSP resources required. It is desirable to maximize downstream transmission rates and send a multi-level signaling at a high baud rate. The DSP resource requirements for equalization and crosstalk cancellation per wire are significant when trying to maximize the downstream throughput and achieve low bit error rates. The preferred embodiment permits an implementation with a quarter of the DSP resources that would have been required with a different framing protocol.

It is yet a further object of a preferred embodiment of the present invention to provide a system and method that allows deployment of advanced new communication products to permit existing electronic equipment (e.g., legacy shelf) to deliver data transmission at higher speeds than originally designed to accommodate and still meet emissions standards.

Still a further object of a preferred embodiment of the present invention is to provide a system and method for effectively distributing bandwidth between data from a common card to the line cards and data from the line cards to the common card. A time division duplex framing protocol allows upstream and downstream traffic on the same lines with the benefits of eliminating crosstalk between upstream and downstream traffic, as well as allowing dynamic changes to the downstream to upstream throughput ratio.

Yet still a further object of a preferred embodiment of the present invention is to provide a method and system that allows for programmability of individual line cards to permit each line card to operate at its own maximum rate. Allowing different bit per symbol rates on each wire and each line card maximizes the system bandwidth.

A further object of a preferred embodiment of the present invention is to provide a method and system that robustly synchronizes a configurable backplane framing protocol without the need for equalization and crosstalk cancellation on every line and on every frame.

Still another object of a preferred embodiment of the present invention is to provide a method and system that efficiently trains a DSP equalizer and crosstalk canceller. Specifically, a control frame and a training frame are provided in every superframe. The control frame includes a training seed field. The training frame uses the training seed at its starting point and uses an algorithm known to the common card and line cards to generate training data. The line cards use the training seed and known algorithm to generate the expected data, allowing a robust and fast DSP training.

Yet another object of a preferred embodiment of the present invention is to provide a method and apparatus that permits scaling of the number of error correction bytes in a payload portion of a frame as the number of fixed size cells for the transmission of data in the payload portion of the frame are varied. For example, where the number of fixed size cells is increased for higher data rates, the number of error correction bytes is also increased.

It must be understood that no one embodiment of the present invention need include all of the aforementioned objects of various preferred embodiments of the present invention. Rather, a given embodiment may include one or none of the aforementioned objects. Accordingly, these objects are not to be used to limit the scope of the claims of the present invention.

In summary, one preferred embodiment of the present invention is directed to a system for transmitting signals in a DSL network. The system includes at least one common card, a plurality of line cards and a bus connecting the at least one common card to the plurality of line cards. The bus has a plurality of wires. The system further includes a framing protocol including a frame to be transmitted over each of the plurality of wires. The frame has a prefix time slot identifying which line card of the plurality of line cards is to receive a signal over a given one of the plurality of wires. Each of the plurality of lines cards is configured to interpret the prefix time slot for each of the plurality of wires so that at any given time traffic may be sent in either of the following manners: (i) from the common card to one of the plurality of line cards over only one of the plurality of wires; and, (ii) from the common card to one of the plurality of line cards over more than one of the plurality of wires.

Another preferred embodiment of the present invention is directed to a method of optimizing the transmission capacity of a bus interconnecting a common card and a plurality of line cards. The bus has a plurality of wires in parallel where each of the plurality of wires were previously dedicated to transmit traffic in only one direction. The method comprises the steps of: (a) selectively transmitting upstream and downstream traffic between the common card and the plurality of line cards over one of the plurality of wires of the bus where downstream traffic is traffic from the common card to one or more of the plurality of line cards and upstream traffic is from one or more of the plurality of line cards to the common card; and, (b) coordinating upstream and downstream traffic over the one of the plurality of wires of the bus by using a framing protocol. The framing protocol includes a frame having a prefix time slot that announces whether traffic on the one of the plurality of wires will be downstream or upstream.

A further preferred embodiment of the present invention is directed to a method of transmitting signals between a common card and a plurality of line cards over a bus having a plurality of wires in parallel. The method comprises the steps of: (a) transmitting traffic between the common card and the plurality of line cards over the plurality of wires; (b) coordinating traffic over the plurality of wires by using a framing protocol, the framing protocol including a frame having a prefix time slot, the prefix time slots includes information to identify which line card of the plurality of line cards will receive traffic on a corresponding wire of the plurality of wires; (c) transmitting the frame having a prefix time slot over each of the plurality of wires; and, (d) each of the plurality of line cards monitoring the prefix time slot on each of the plurality of wires to determine whether a given line card of the plurality of line cards will receive information on a given wire of the plurality of wires, such that all of the plurality of wires are available to transmit traffic to a given line card at a given time.

Still a further embodiment of the present invention is directed to a method of distributing bandwidth between data from a common card to one or more line cards and data from one or more line cards to the common card. The method comprises the steps of: (a) monitoring by the common card the proportional relationship of data to be transmitted from one or more line cards to the common card and data to be transmitted from the common card to one or more line cards, the monitoring including polling of the one or more line cards by the common card by monitoring an upstream frame transmitted from one or more line cards to the common card to determine whether the one or more line cards have data to transmit to the common card; and, (b) transmitting from the common card to the one or more line cards a downstream frame having a prefix time slot that identifies to the one or more line cards whether a given frame will be used to transmit data from the common card to one or more line cards or from the one or more line cards to the common card.

Yet a further embodiment of the present invention is directed to a framing protocol for transmission between a common card and a plurality of line cards allowing each of the plurality of line cards to be optimally configured. The framing protocol includes a super frame for transmission between a common card and a plurality of line cards. The super frame has at least one control frame. The control frame includes a global parameters field, card config and card config select fields. The global parameters field includes configuration information to define the superframe and frame sizes aspects of each of the plurality of line cards in the same manner. The card config and card config select fields includes configuration information to individually configure data transmission aspects of each of the plurality of line cards to allow each of the plurality of line cards to operate optimally.

Still another embodiment of the present invention is directed to a method of robustly synchronizing a system including a common card, a plurality of line cards and a bus interconnecting the common card and the plurality of line cards. The method comprises the steps of: (a) providing a framing protocol including at least one super frame having a plurality of frames, the plurality of frames each having a prefix time slot including a cyclic redundancy check, the super frame including at least one control frame having a synchronization field used to get initial synchronization to a backplane; (b) transmitting the control frame between the common card and the plurality of line cards; (c) at least one of the plurality of line cards using the synchronization field of the control frame to obtain initial synchronization to the backplane; (d) the at least one of the plurality of line cards verifying that it is still synchronized to the backplane by verifying the cyclic redundancy check in each prefix time slot of each of the plurality of frames; and, (e) after a predetermined number of incorrect redundancy checks, the at least one of the plurality of line cards begins searching for the synchronization field in at least one of the control frames.

The foregoing summaries are of preferred forms of the present invention. The scope of the present invention is in no way limited to these preferred forms.

BRIEF DESCRIPTION OF THE DRAWINGS

FIG. 9 is a table of various Card Configuration Parameters in accordance with a preferred embodiment of the present invention.

DETAILED DESCRIPTION OF THE PREFERRED EMBODIMENTS

Preferred forms of the invention will now be described. The appended claims are not limited to the preferred forms and no term and/or phrase used herein is to be given a meaning other than its ordinary meaning unless it is expressly stated that the term and/or phrase shall have a special meaning.

The preferred forms of the present invention can be used in a legacy self. However, it will be readily understood that the preferred forms of the present invention are not limited to use in a legacy shelf. Rather, the preferred forms may used in any suitable environment.

Figure 1:
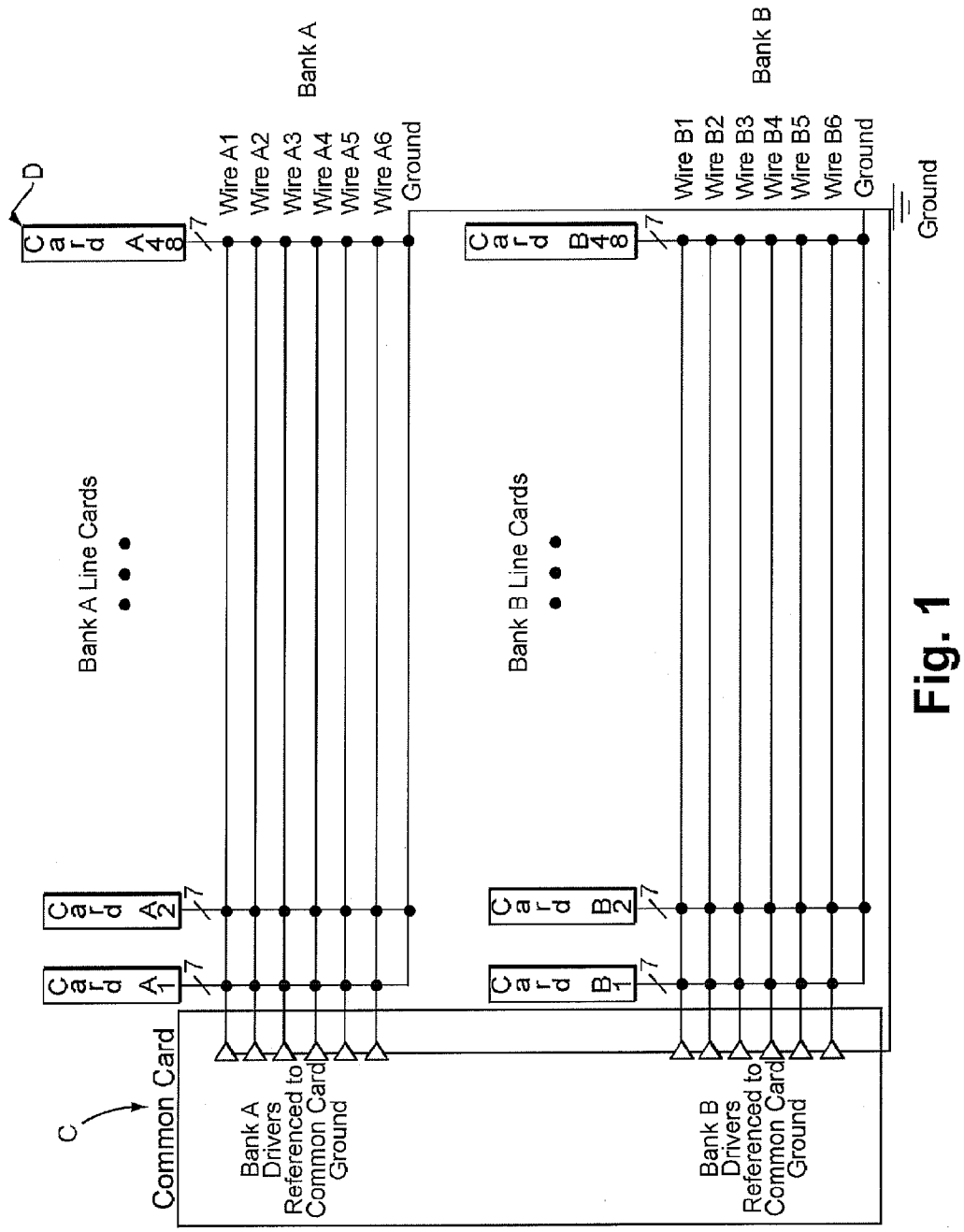
FIG. 1 is a schematic of a conventional legacy shelf.
Figure 3:
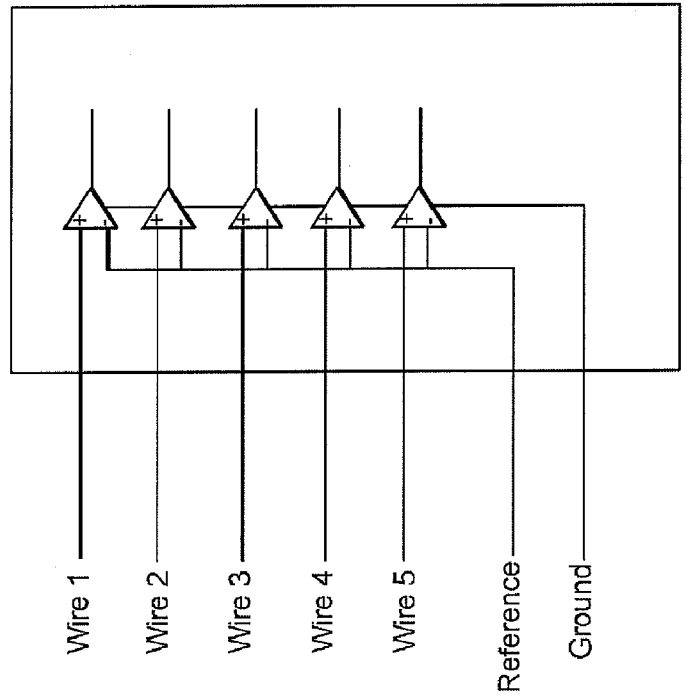
FIG. 3 illustrates the line card receiver architecture of a modified legacy shelf in which a preferred embodiment of the present invention can be utilized. Specifically, unlike a conventional legacy shelf, one of the six wires in this modified form is used as a reference on downstream transmissions and the signals on the other remaining wires are received with respect to the reference.
Figure 2:
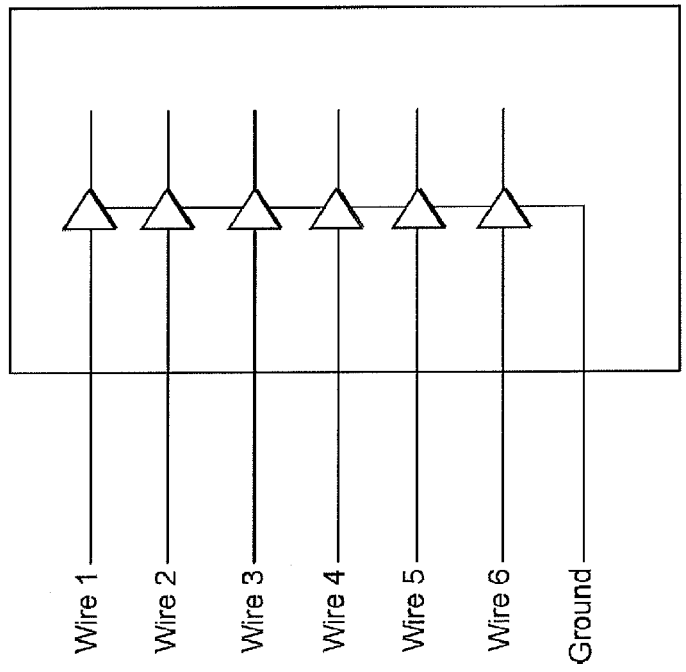
FIG. 2 illustrates the line card receiver architecture of a conventional legacy shelf in which the signal is received with respect to ground.

FIG. 1 depicts one of numerous environments in which the preferred forms of the present invention may be utilized. FIG. 1 depicts a legacy shelf or dual channel bank 10 including two banks A and B. Each bank typically includes forty-eight line cards. Line cards A1 through A48 are connected to common card C via wires A1 through A6. Line cards B1 through B48 are connected to common card C via wires B1 through B6. In a conventional legacy shelf, the signals on each of the six wires of a given bus are received with respect to ground as shown in FIG. 2. The common card's ground reference is modulated by return currents for banks A and B passing through the ground conductor impedance. Using wires A6 and B6 to transmit a reference signal in downstream traffic so that the line cards can receive the signals on the other wires of a corresponding bus against the reference signal as shown in FIG. 3, cancels (i.e., eliminates or reduces) this ground bounce by subtracting the reference signal from the other signal that it is received against. Further, parasitic mutual capacitance and parasitic mutual inductance that occurs within a bank is also reduced. The reference signal may include a small amplitude pilot tone to be used for line card timing recovery. The reference signal may be filtered with a filter to optimize interference cancellation. However, it is not necessary that the sixth wire be used to carry a reference signal in downstream traffic to practice the present invention.

Preferably, the framing protocol of the preferred forms of the present invention use five of the six wires of each of the buses for bank A and bank B for transfers from the common card C to the plurality of line cards D. Specifically, wires A1 to A5 and B1 to B5 are used to carry data from common card C to the plurality of line cards D. Wires A6 and B6 are preferably used to carry a reference signal in the downstream direction. However, it should be noted that any of the wires of a given bus could be designated as one of the five wires to carry data while any of the other wires could be designated to carry the reference signal. For traffic from the plurality of line cards D to common card C, the framing protocol of the preferred forms of the present invention uses all six wires to transmit data over the backplane.

As more fully explained below, the framing protocol of the preferred form of the present invention allocates portions of the bandwidth to traffic from common card C to the plurality of line cards D and from the plurality of line cards D to common card C. Preferably, the transfers are such that traffic moves in only one direction at any given time, i.e., traffic from common card C to the plurality of line cards D will not be sent simultaneously with traffic from the plurality of line cards D to common card C. Preferably, a higher symbol rate is used to achieve higher data rate. Preferably, multi-level PAM is used to send multiple bits per symbol. The framing protocol of the preferred forms of the present invention allows each wire on each of the plurality of line cards to be configured separately from the common card via H/W level messaging based on, e.g., SNR and training error measurements. This feature also allows for future improvements or added features on the backplane. The framing protocol of the preferred forms of the present invention permits transfers to occur on one or more wires to a plurality of line cards D. Line card reception of data on a single wire at specific frames minimizes DSP resources such as equalization and cross talk cancellation.

Figure 4:
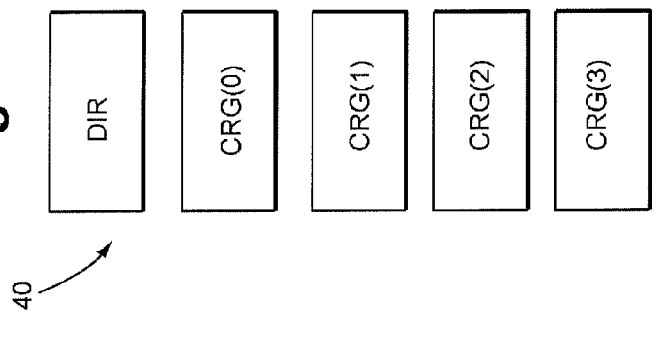
FIG. 4 illustrates the repeated frame structure of a framing protocol in accordance with a preferred embodiment of the present invention.

Transfers across the backplane are organized into frames. Preferably, the size (in time) of the frame is constant, although it is configurable. FIG. 4 illustrates the repeated frame structure of the framing protocol of the preferred form of the present invention. Specifically, each frame E preferably includes a prefix time slot 10 and a payload time slot 20. The prefix 10 is preferably run at the nominal clock rate. Further, prefix 10 is preferably a single bit per symbol (i.e., 2-level PAM).

Figure 5:
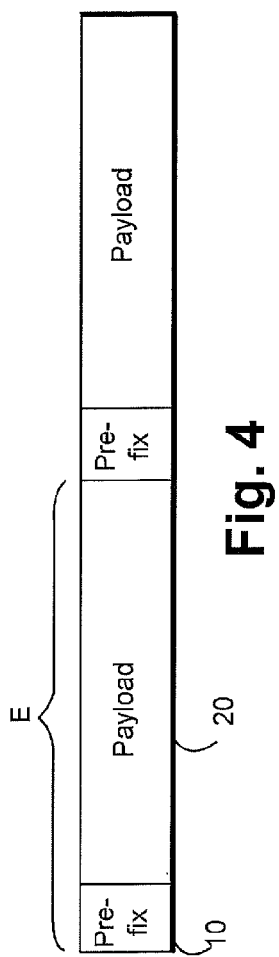
FIGS. 5 and 6 illustrate portions of the prefix of a frame.

Prefix 10 can be divided into multiple sections including a bank prefix section 30, a preferred form of which is depicted in FIG. 5. The bank prefix section 30 is decoded by every line card so that each line card can determine over which wire or wires of a corresponding bus the line card is to receive or send traffic in the current frame. For transfers from common card C to lines cards D, five line card addresses are included in bank prefix section 30, one for each physical backplane wire that carries data. The line card addresses for a given physical backplane wire N indicates that during this frame, the selected line card will receive data on physical backplane wire N. For example, bank prefix section 30 on all five wires could identify a separate line card such that each line card would receive data on a single wire. Alternatively, bank prefix section 30 for two or more of the wires could identify the same line card to receive data on two or more wires simultaneously. This framing protocol permits a transfer to a given line card over only one or all of the wires of a corresponding bus. Where the transfer occurs over one or only a few wires of the bus, the DSP resources of the line cards required to receive multi-level symbols are minimized as compared to transfers over most or all wires of the bus.

For transfers from the plurality of line cards D to common card C, each wire N card address applies to two wires. Preferably, only wire N card addresses on wires 0, 2 and 4 are used. These addresses indicate that transfers will be sent on wires 0 and 1; 2 and 3; and 4 and 5, respectively. Preferably, the following addressing is used:

0: no payload
   1 to 48: corresponds to line cards 1 to 48 in a given bank
   49 to 60: correspond to undiscovered addresses 1 through 12
   61: reserved
   62: equalization frame
   63: init frame As opposed to including in the prefix indicia identifying an init frame and/or an equalization frame, the line cards could be configured to know at a given time the frame in a super frame must be an init frame or an equalization frame. In this instance, there would be no need to provide addresses for the equalization frame and/or the init frame.

Figure 6:
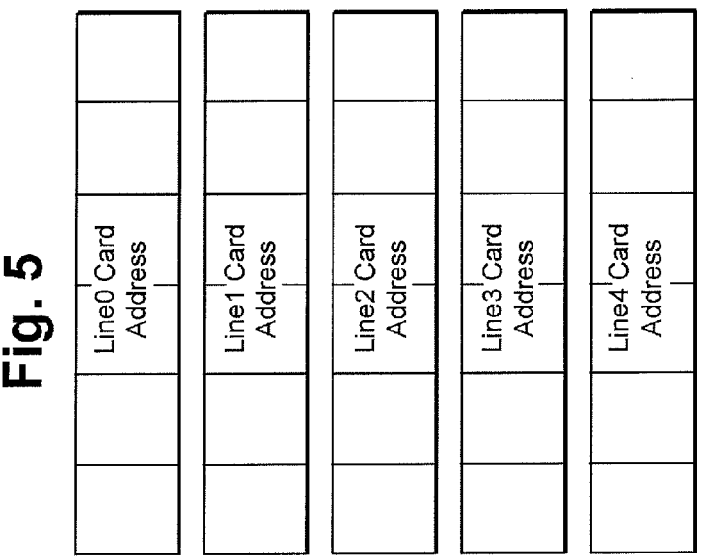

The prefix 10 may also include a CRC prefix section 40, a preferred form of which is depicted in FIG. 6. CRC prefix section 40 includes a single bit field DIR that indicates the direction the transfer will occur during the next frame (i.e., the payload that follows the next prefix). Preferably, a "0" indicates a transfer from common card C to the plurality of line cards D while a "1" indicates a transfer from the plurality of line cards D to common card C. The CRC prefix section 40 also may include CRC, a 4-bit cyclic redundancy checker on all the bits in the prefix. The CRC uses the DIR bit from the previous prefix since it applies to the current frame. The CRC is preloaded with four 1s in the LSBs and the DIR from the previous frame in the MSB and uses the following polynomial $x^4+x+1$. The bits are fed in the order they are received with wire 4 being the first bit. The CRC is used to verify the integrity of the prefix. An incorrect CRC will cause all drivers to turn off for the current frame and will cause all receivers to ignore the data they have received. The CRC is also used to verify synchronization to the framing structure. Too many prefix CRC errors will cause a line card to consider itself no longer locked to the backplane, forcing the line card to re-synchronize. The prefix 10 may also include a card prefix section that provides additional information to the card that will be sending or receiving traffic during a given frame.

Accordingly, the prefix 10 identifies the line cards to receive or transmit information, the wire or wires over which a given line card will receive or transmit information and the direction of the transfer. Further, the prefix is used to verify that the line cards are in synch with the system.

Figure 7:
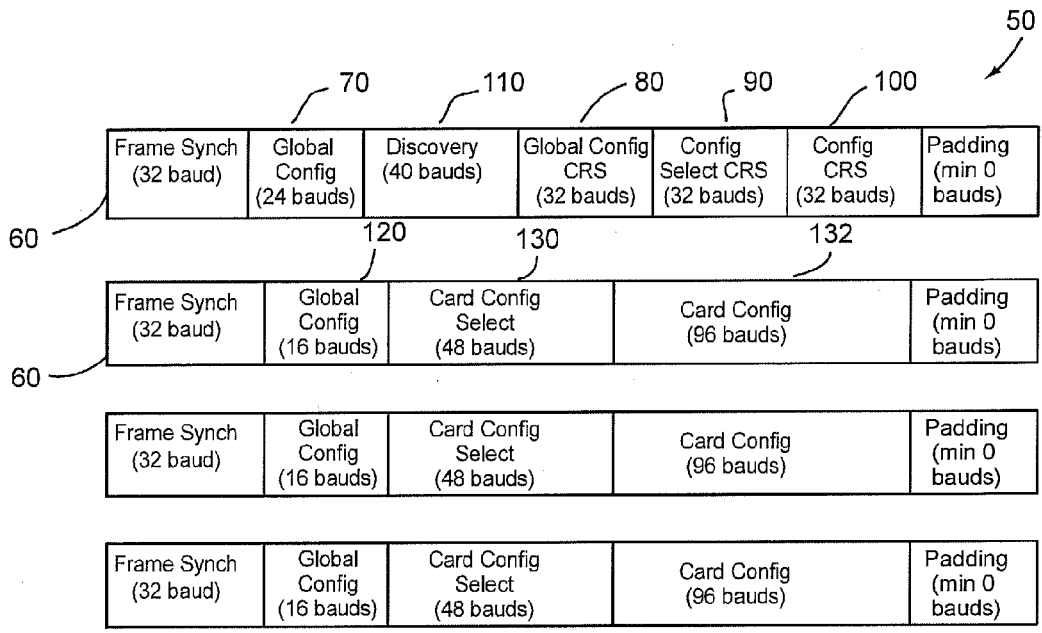
FIG. 7 illustrates an init (initialization) frame of a super frame of a framing protocol formed in accordance with a preferred embodiment of the present invention.

The framing protocol of the preferred form of the present invention includes a super frame structure including a programmable number of frames. The start of a super frame is marked by the Init Frame 50, a preferred form of which is depicted in FIG. 7. The number of frames in the super frame are provided in the Init Frame 50. The Init Frame 50 follows the same framing structure as other frames, i.e., the payload portion is preceded by a prefix. The second frame in a super frame is an equalization frame. The third frame in the super frame preferably is an upstream frame. This allows a line card an extra frame to process equalization data. After the third frame, the frames can be either upstream or downstream. The common card C determines which of the frames are upstream frames or downstream frames. More than one equalization frame may be included in a super frame. The equalization frames are preferably followed by an upstream frame.

The Init Frame 50 is used to obtain an initial framing synchronization. However, once framing synchronization is achieved, it is verified by checking the CRC in the prefix 10. The preferred form of the payload portion of the Init Frame 50 is depicted in FIG. 7. The five lines in the Init Frame 50 are carried over the five wires 0 to 4 of a corresponding bus one line per wire as are sections 30 and 40 of prefix 10.

Init Frame 50 includes a Frame Synch portion 60. The Frame Synch portion 60 is a regular pattern used to synchronize the line cards to the backplane framing structure. Init Frame 50 includes the Global Config 70 which may optionally also include an equalization seed. The equalization seed may be used as the start of the scrambling in the equalization frame. The Frame Synch portion 60 includes Global CRC 90 and Card CRC 100 (collectively, the "CRCs"). In the preferred embodiment, a Global CRC 90 and a Card CRC 100 are provided for each line of the Frame Synch after the initial line of the Frame Synch 60 to verify continued frame synchronization. In the present example, four Global CRCs and four Card CRCs are provided for a total of eight CRCs. The data bits are fed in the order they are received with wire 1 being the first bit. The CRCs are pre-loaded with 1s. The bits are fed as they are received with wire 4 being the first bit, and wire 1 being the last bit. Preferably, the polynomial used is: $x^{32}+x^{26}+x^{23}+x^{22}x^{16}x^{12}+x^{11}+x^{10}+x^{8}+x^{7}+x^{5}+x^{4}+x^{2}+x^{1}+x^{0}$. This is the same polynomial used for Ethernet and AAL5.

Init Frame 50 further includes a Global Config portion 120. This portion includes global configuration parameters used by all of the line cards in a system that define the superframe and frame sizes. A list of preferred configuration options includes the number of bauds per frame, number of frames per superframe, ratio of downstream frames to upstream frames, and equalization training seed and PAM level. There are reserved configuration nibbles for future expansion. Additional Init Frames can be added to further expand the configuration options.

Init Frame 50 further includes Card Config Select portion 130. Each line card can be assigned one of eight card configurations that optimizes its performance. An undiscovered card will always default to Card Config Select equal to 0.

Init Frame 50 includes Card Config portion 132. Card config fields include sets of configuration information to individually configure data transmission aspects of each of said plurality of line cards to allow each of said plurality of line cards to operate optimally. Card Config includes fields for payload PAM level, Reed Solomon T parameter, interleaving and trellis coding.

The equalization frame in a super frame is used to train the line card receivers. The common card C may have to rotate between all the different PAM levels that may be required by the system, i.e., it may be required to send different PAM levels during different super frames. The PAM level of the Equalization Frame is specified in the Init Frame. If extra equalization frames are inserted into a super frame, all equalization frames should use the same PAM level. The equalization data is a pseudo-random pattern generated by the common card. Each baud in an equalization frame payload preferably carries data from this pattern. An equalization frame payload is preceded by a prefix like every other frame in the preferred framing protocol of the present invention. Each wire has a different pattern. The line cards can generate the expected data by using the seed from the Init Frame and doing the same calculations performed in the common card. The scrambler pattern is uncorrelated between lines and long enough to ensure good randomization for equalizer training and DC bias. All the bits transmitted within a single baud are XORed with a scrambling pattern. The scrambling pattern is generated from a 30 bit linear feedback shift register with polynomial taps {29,26,25,23,22,18,16,15,12,10,8,6,5,4,2,0}. The shift register is shifted five times per baud. Each wire uses up to 6 bits of the scrambling pattern to scramble its data, with the lowest numbered wire using the least significant bits of the scrambling pattern, and the highest numbered wire using the most significant bits of the scrambling pattern. Data directed equalization is very robust due to its known pattern.

The payload to or from a line card is delivered over a single wire at a predetermined PAM rate. For downstream traffic, the PAM rate is set by the common card based on SNR and training error values received from the line card D. The common card C sets the PAM rate using the Card Config Select field in Init Frame 50. For upstream traffic, the common card C determines the PAM rate and sets it using the Init Frame 50. Alternatively, data to or from a line card D can be sent over multiple wires simultaneously by specifying the same line card D for two or more wires in the prefix 10. Preferably, when data is sent over multiple wires to a single line card, the data is arranged primarily in order of bauds, then in order of wires. For example, if sending data over wire 0 at 4 bits/baud and wire 1 at 3 bits/baud, the first 4 bits are sent over wire 0 (first baud) and the next three bits are sent over wire 1 (first baud). The next 4 bits are sent over wire 0 (second baud) and the next 3 bits are sent over wire 1 (second baud). Effectively the multiple wires appear as if a single wire were sending at a bit/baud rate that is the sum of all the bit/baud rates of the wires being used. This protocol allows for ½ increments of bits per baud. Effectively, the number of supported signal levels is chosen such that 2N+1 (N is a whole number) bits can be transferred over 2 baud periods. Preferably, the payload is scrambled in the same manner as the Equalization Frame.

Upstream and downstream payloads are delivered in blocks. Each block can be protected by a CRC16 or CRC8 to detect errors as well as Reed-Solomon encoding to detect and correct errors. The size of the blocks, as well as the use of CRC16 or Reed-Solomon FEC is programmable. A single frame can support multiple blocks. The CRC16 polynomial preferably used is: $x^{16}+x^{12}+x^5+x^0$. The CRC is preloaded with 1s. The bytes are fed as received, with the MSB being the first bit in the CRC. The bytes are fed as received, with the MSB being the first bit in the CRC. Regarding the Reed-Solomon encoder/decoder, all arithmetic is performed in the Galois Field space GF(256) The generator polynomial is given by g(x), as defined below. The primitive field element $\alpha$ is defined to be the root of the primitive polynomial p(x), as defined below. The polynomial representation of each input byte is given by $d_7\alpha^7+d_6\alpha^6+d_5\alpha^5+d_4\alpha^4+d_3\alpha^3+d_2\alpha^2+d_1\alpha+d_0$, where $d_0$ is the LSB.

$$g(x) = \prod_{i=0}^{R-1}(x + \alpha^i)$$

$$p(x) = x^8 + x^4 + x^3 + x^2 + 1$$

Preferably, the FEC block will accept codewords with up to 255 bytes. The number of correctable errors is preferably programmable from 0 to 16. This corresponds to 0 to 32 check bytes. The number of bytes per block may be limited to 255 bytes (+CRC+FEC) where desired. When the number of bauds used to deliver payload is less than the number of available bauds in a frame, padding is inserted at the end of the frame.

Preferably, downstream payload begins immediately after the prefix 10 and ends just prior to the start of the next prefix. However, guardbands can be added around prefix 10. The common card can be constrained to never send data to the same card in three consecutive frames. This allows the line card more real time to process the received data. To support simpler implementation of data protocols over multiple possible PAM levels, the common card C and line cards D may be required to support continuation of data over multiple frames. For example, in ATM running over backplane 3.5 bits/baud, the common card C might be implemented to deliver up to 7 cells over 2 frames, and the line card D would be implemented to recognize when this occurs. This could be done by assuming the first downstream frame destined for a line card D within a super frame is the first frame of a 2-frame transfer. If the last cell is an idle cell, the half idle cell is discarded, and the line card D is reset to consider the next downstream frame the first frame of a two frame transfer. If the first frame ends in a non-idle ATM cell, then the line card D assumes that the next downstream frame is the second frame in a two frame transfer. Alternatively, this can be done by adding an expansion bit.

Figure 8:
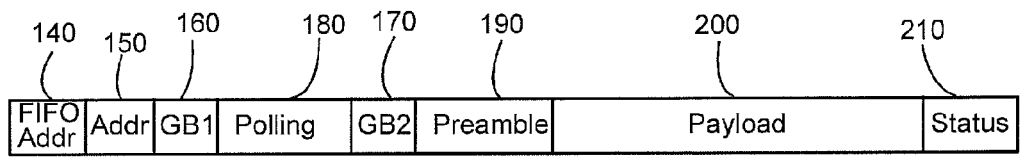
FIG. 8 illustrates the payload format for an upstream frame of a framing protocol formed in accordance with a preferred embodiment of the present invention.

A preferred form of the upstream payload format is depicted in FIG. 8. The FIFO Addr field 140 specifies the FIFO that will send upstream data. The number of bauds used depends on the number of FIFO supported per line card. Preferably, the FIFO Address is spread across two wires. The first baud is the MSBs, with the highest wire number being the MSB. The Addr field 150 is preferably 1-baud address for the next group of line cards to be polled on the next upstream frame. Address 0 indicates that line cards 1 to 6 will respond to polling on wires 0 to 5 respectively. Address 1 indicates that line cards 7 to 12 will respond, etc. Addresses 12 and 13 are reserved for undiscovered addresses 1 to 6 and 7 to 17, respectively. MSB of address is on highest wire number. GB1 field 160, GB2 field 170 and GB3 180 are guard bands. Preamble field 190 allows the common card to synchronize its receiver timing to the line card transmitting a payload. The preamble length may be configurable via the Init Frame 50 if desired. Payload field 200 has a block structure as described above. Preferably the payload is transmitted on two wires per line card. Status field 210 provides the result of the line card currently transmitting after transmission. Polling field 220 is for line cards to signal pending traffic to the common card, with one line card per wire. The polling information is preferably spread across two wires.

The preferred polling operation will now be described. In each upstream frame, the Addr field 150 indicates which cards will be polled on the next upstream frame. Preferably, each line card maps its bank slot ID to the Polling Addr and wire on which to respond. Six line cards preferably respond to polling every upstream frame. After an upstream transmission, a line card will give its status in Status field 210 so that it does not have to wait until the next time it is polled to send upstream data. The updated status represents the status of the FIFO after upstream transmission, i.e., if the transmitted data was the last to send in that FIFO, it will be reflected in the status by the corresponding status bit being low. The common card uses the results from the polling to determine which line card can transmit and uses the prefix 10 to indicate which card will send data (and on which wire(s)) in a given frame.

The preferred discovery sequence for undiscovered line cards is as follows:

(1) an undiscovered line card looks for the Frame Synch field in the Init Frame 50;

(2) if found, the line card programs its global parameters from the Init Frame Global Configuration if the Global Configuration CRC passes (if it fails, return to step (1)), if multiple Init Frames are supported, preferably the line cards find Init Frame 0 to proceed since the Global Configurations affect the basic framing structure;

(3) the line card checks the prefix CRC, and considers synchronization to be lost if a given number of successive CRCs in a row fail—if synchronization is lost return to step (1);

(4) if the Frame Synch is detected a second time where expected, and all the Init Frames CRCs pass, the card is considered locked to the backplane; note that where multiple Init Frames are supported, then the line card should receive all the possible Init Frames before considering itself locked so that it can be fully configured;

(5) the line cards continuously check the prefix CRC, and considered to have lost synchronization if a specific number of consecutive CRCs fail;

(6) line card does equalization training;

(7) the line card uses legacy SLC5 signals and discovery protocol to determine its slot within a die group;

(8) the line card uses the slot ID address instead of undiscovered address for link setup and card configuration such as what higher PAM levels each wire can operate at.

(9) the common card polls undiscovered line cards and grants access to line card—up to 4 cards could respond to the same address in which case the CRC will fail and the responses will be discarded and they will have to retry;

(10) line card sends FINDME OAM message with card serial ID;

(11) common card sends EXPECT_PROBE to all 1 to 4 cards at undiscovered address;

(12) common card gets BC card to use MSG interface to probe a specific slot;

(13) if line card receives probe, responds with OAM FOUNDME message including card serial ID, otherwise if timer expires the line card responds with OAM FOUNDMENOT message;

(14) if FOUNDME message is sent, the common card responds with OAM SETUP_COMMS, with serial ID and slot ID;

(15) line card that matches serial ID can now use slot ID address instead of undiscovered address;

(16) in parallel with discovery, the line card H/W can train at higher PAM levels; and,

(17) when a line card is trained and discovered, it sends a message to the common card indicating it is ready for multibit transfers and giving the common card enough information to decide the number of bits per symbol it can send.

Preferably, there are three guard bands in the framing protocol: (1) upstream to downstream guard band; (2) downstream to upstream guard band; and, (3) upstream payload to upstream polling guard band.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A network system for transmitting a signal having a framing protocol comprising:
    a common card and a plurality of line cards across a backplane having a plurality of lines in parallel connecting the common card and the plurality of lines cards in parallel communication, said framing protocol allowing each of said plurality of lines cards to be optimally configured and including:
    (a) a super frame for transmission between the common card and the plurality of line cards;
    (b) said super frame having at least one control frame, said control frame including a global parameters field and a line card field, said global parameters field including configuration information to configure one or more aspects of each of said plurality of line cards in the same manner, said line card field including configuration information to individually configure one or more aspects of each of said plurality of line cards to allow each of said plurality of line cards to operate optimally
    wherein said framing protocol is not transmitted outside the network electronic equipment shelf and is transparent to equipment connected to the network electronic equipment shelf.

2. The framing protocol as set forth in claim 1, wherein:
    (a) said global field parameters includes at least one of the following:
        (i) number of bauds per frame
        (ii) number of frames in a super frame;
        (iii) ratio of downstream frames to upstream frames;
        (iv) training seed and PAM level for equalization frame;
        (v) guardband sizes; and
        (vi) number of expansion bits in prefix time slot;
    where upstream refers to flow from one or more of said plurality of line cards to said common card.

3. The framing protocol as set forth in claim 2, wherein:
    (a) said global parameters field is expandable.

4. The framing protocol as set forth in claim 1, wherein:
    (a) said global field parameters includes each of the following parameters:
        (i) number of bauds per frame;
        (ii) number of frames in a super frame;
        (iii) ratio of downstream frames to upstream frames;
        (iv) training seed and PAM level for equalization frame;
        (v) guardband sizes; and
        (vi) number of expansion bits in prefix time slot;
    where upstream refers to flow from one or more of said plurality of line cards to said common card.

5. A framing protocol as set forth in claim 1, wherein:
    (a) control frame includes an equalization seed and said super frame includes an equalization frame, said equalization seed is a multi-bit seed used to start scrambling in said equalization frame, said equalization frame is used to train receivers of said plurality of line cards.

6. The framing protocol as set forth in claim 1, wherein:
    (a) said card config field includes sets of configurations of at least one of the following:
        (i) number of bits per symbol per wire during a payload transmission;
        (ii) T parameter for Reed Solomon codeword;
        (iii) Interleaving on or off; and,
        (iv) trellis coding on or off
    where the card config select field is used to indicate which card config set to use on specific line cards to optimize performance.

7. The framing protocol as set forth in claim 1, wherein:
    (a) said card config field includes sets of configurations of each of the following:
        (i) number of bits per symbol per wire during a payload transmission;
        (ii) T parameter for Reed Solomon codeword;
        (iii) Interleaving on or off;
        (iv) trellis coding on or off;
    where the card config select field is used to indicate which card config set to use on specific line cards to optimize performance.

8. In a legacy shelf for transmitting a signal having a framing protocol comprising:
    a common card and a plurality of line cards across a backplane having at least six lines in parallel connecting the common card and the plurality of lines cards in parallel communication, said framing protocol allowing each of said plurality of line cards to be optimally configured and including:
    (a) a super frame generated by said common card for transmission between a common card and a plurality of line cards across at least five of the six parallel connecting lines;
    and, (b) said super frame having at least one control frame, said control frame including a global parameters field and a line card field, said global parameters field including configuration information to configure one or more aspects of each of said plurality of line cards in the same manner, said line card field including configuration information to individually configure one or more aspects of each of said plurality of line cards to allow each of said plurality of line cards to operate optimally
    wherein said framing protocol is not transmitted outside the network electronic equipment shelf and is transparent to equipment connected to the network electronic equipment shelf.

9. In a network electronic equipment shelf for transmitting a signal having a framing protocol comprising:
    a common card and a plurality of line cards across a backplane bus having a plurality of lines in parallel connecting the common card and the plurality of lines cards in parallel communication, said framing protocol allowing each of said plurality of line cards to be optimally configured and including:

(a) a super frame for transmission between a common card and a plurality of line cards;
(b) said super frame having at least one control frame, said control frame including a global parameters field and a line card field, said global parameters field including configuration information to configure one or more aspects of each of said plurality of line cards in the same manner, said line card field including configuration information to individually configure one or more aspects of each of said plurality of line cards to allow each of said plurality of line cards to operate optimally, and
(c) a line frame to be transmitted over each of said plurality of lines, said line frame having a prefix time slot identifying which line card of said plurality of line cards is to receive a signal over which one of said plurality of lines;

wherein said framing protocol is not transmitted outside the network electronic equipment shelf and is transparent to equipment connected to the network electronic equipment shelf.

10. The framing protocol of claim 9 including six upstream line frames and five downstream line frames.

11. The framing protocol of claim 9 including six, independent upstream line frames and five, independent downstream line frames.

12. The framing protocol of claim 9, wherein the line frame to be transmitted over each of said plurality of lines is independent of each of the other line frames to be transmitted over each of said plurality of lines.

* * * * *